United States Patent
Carter et al.

(10) Patent No.: US 8,000,911 B2
(45) Date of Patent: Aug. 16, 2011

(54) AUTOMATED HIERARCHICAL CLASSIFICATION FOR UTILITY SYSTEMS WITH MULTIPLE SOURCES

(75) Inventors: Ronald W. Carter, Murfreesboro, TN (US); Amjad Hasan, Murfreesboro, TN (US); Jon A. Bickel, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 582 days.

(21) Appl. No.: 12/151,309

(22) Filed: May 6, 2008

(65) Prior Publication Data

US 2009/0281742 A1    Nov. 12, 2009

(51) Int. Cl.
*G06F 17/00*    (2006.01)
(52) U.S. Cl. ............... 702/60; 702/57; 702/61; 370/503
(58) Field of Classification Search ............... 702/57–61, 702/164; 370/503
See application file for complete search history.

(56) References Cited

U.S. PATENT DOCUMENTS

| 7,272,518 B2 | 9/2007 | Bickel et al. |
| 2007/0014313 A1 | 1/2007 | Bickel et al. |

FOREIGN PATENT DOCUMENTS

WO    WO 2007/032944    3/2007

*Primary Examiner* — Drew A Dunn
*Assistant Examiner* — Hien X Vo

(57) ABSTRACT

A method for automatically determining how monitoring devices in an electrical system having a main source of energy and at least one alternative source of energy (e.g., another utility source, a generator, or UPS system) are connected together to form a hierarchy. The end-user inputs identification information about the monitoring device(s) monitoring the alternative source of energy. The method receives time-series data from the monitoring devices and determines a model type of the electrical system by analyzing the monitoring device's time-series data. Once the model type is known, the method builds the complete monitoring system hierarchy in which the monitoring devices that are monitoring the main and alternative sources are placed properly. The method can also validate polarity nomenclature of the time-series data to account for end-user's varying polarity configurations.

20 Claims, 16 Drawing Sheets (Generator as Load Model)

(Non-Radial Fed Model)

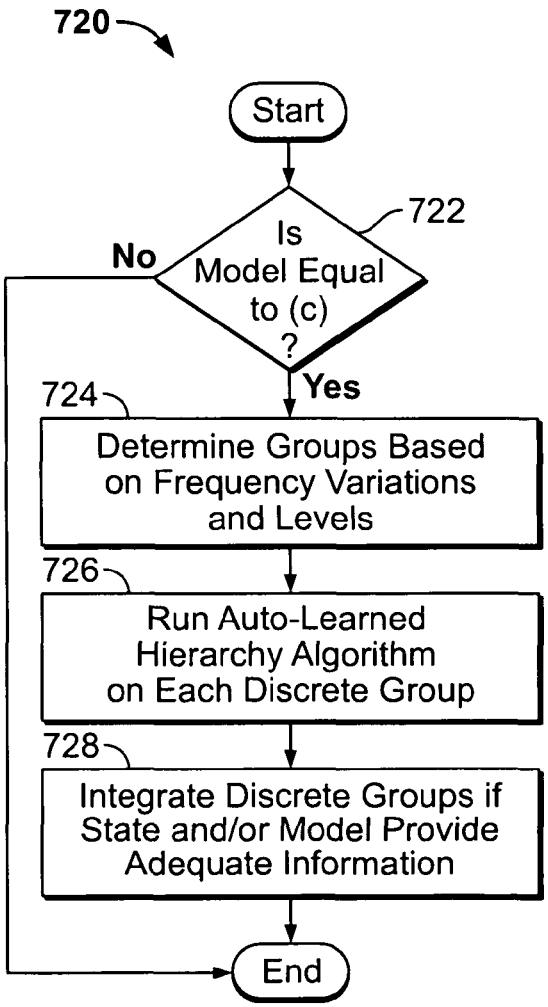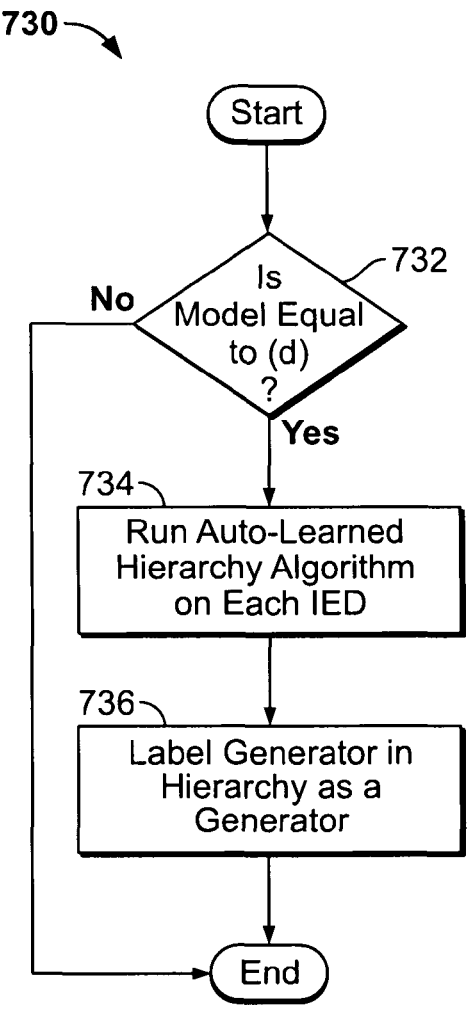
(Islanding Model)
FIG. 7C
(Generation Model)
FIG. 7D

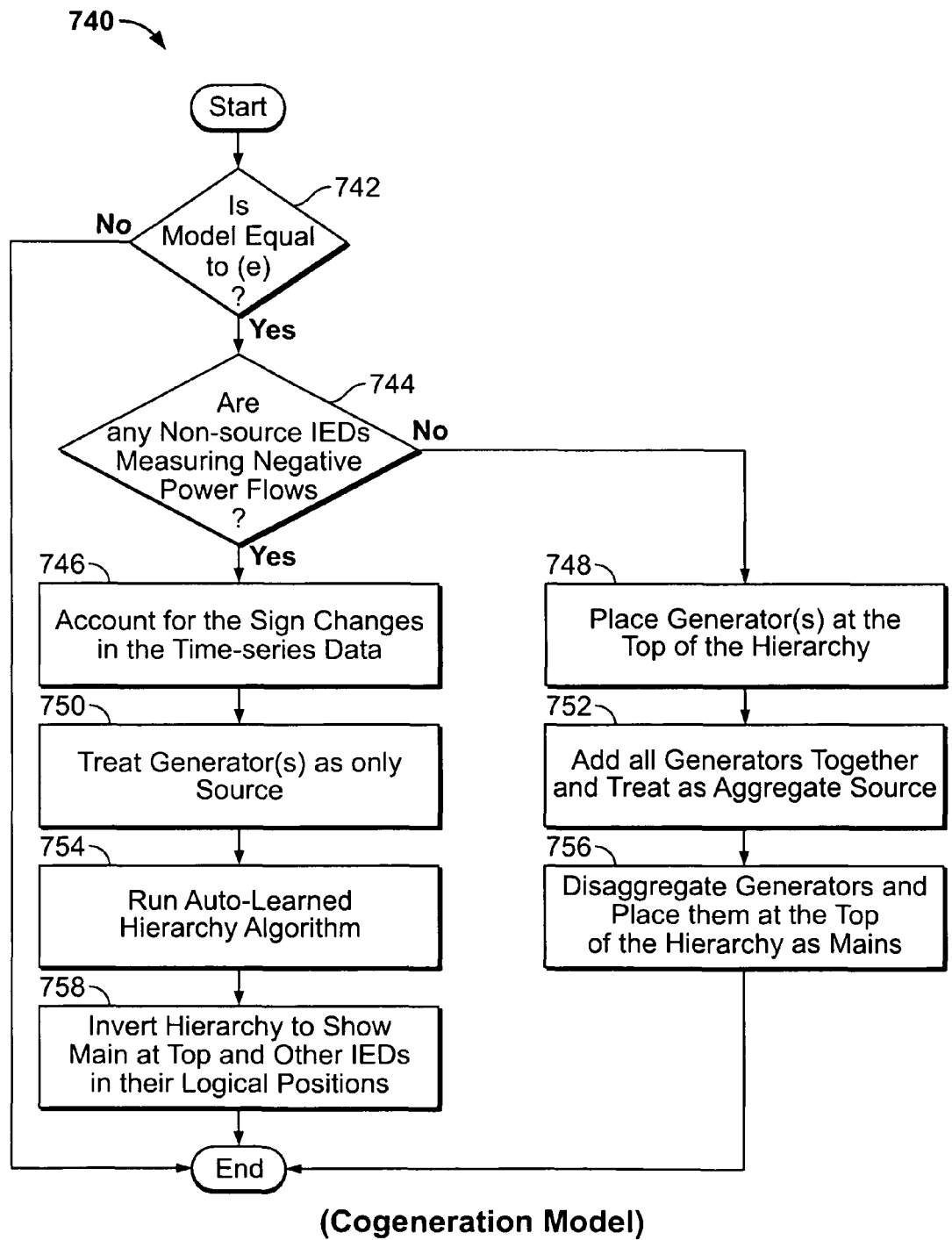
FIG. 7E (Cogeneration Model)

(Load Reduction Model)

(Radial Model)

AUTOMATED HIERARCHICAL CLASSIFICATION FOR UTILITY SYSTEMS WITH MULTIPLE SOURCES

FIELD OF THE INVENTION

Aspects disclosed herein relate generally to utility systems, and, in particular, to an automated hierarchical classification method for utility systems with multiple sources.

BACKGROUND

Auto-learned hierarchy algorithms are described in commonly assigned U.S. Pat. No. 7,272,518, titled "Automated Hierarchy Classification in Utility Monitoring Systems," issued Sep. 18, 2007, which automatically determine a hierarchical arrangement of monitoring devices within an utility system, typically a radial-fed utility system having a main source of a utility. Some utility systems may include more than one source of a utility, such as generators, additional utility source points-of-delivery (sometimes referred to as a "utility" for short), uninterruptible power supply (UPS) systems, and the like. What is needed is an automated method for determining a hierarchy of a utility system that includes more than one source, wherein the automated method can differentiate among various types of multiple source utility models.

BRIEF SUMMARY

Having a thorough knowledge of an electrical power system's layout is essential to understanding and characterizing the electrical system; however, power meters typically only provide discrete electrical operating parameters with no context for the data. Having hierarchical context for the monitoring system data is a powerful tool that provides many useful benefits including troubleshooting system problems, improving system efficiencies, predicting failures and degradation, locating the source of disturbances, and modeling system responses.

The methods and algorithms disclosed herein automatically determine many additional monitoring system configurations having multiple sources of a utility based upon only data received from each discrete monitoring device and little or no user input. The level of detail given by the auto-learned multi-source hierarchy algorithm herein is commensurate with the number and extent of monitoring devices on the electrical system. As additional monitoring points are added, the auto-learned multi-source hierarchy algorithm automatically incorporates them into the determined hierarchical structure.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIGS. 7A-7G are flow chart diagrams of various aggregate IED placement algorithms based upon the model types shown in FIGS. 2A-2G, respectively.

Figure 1A:
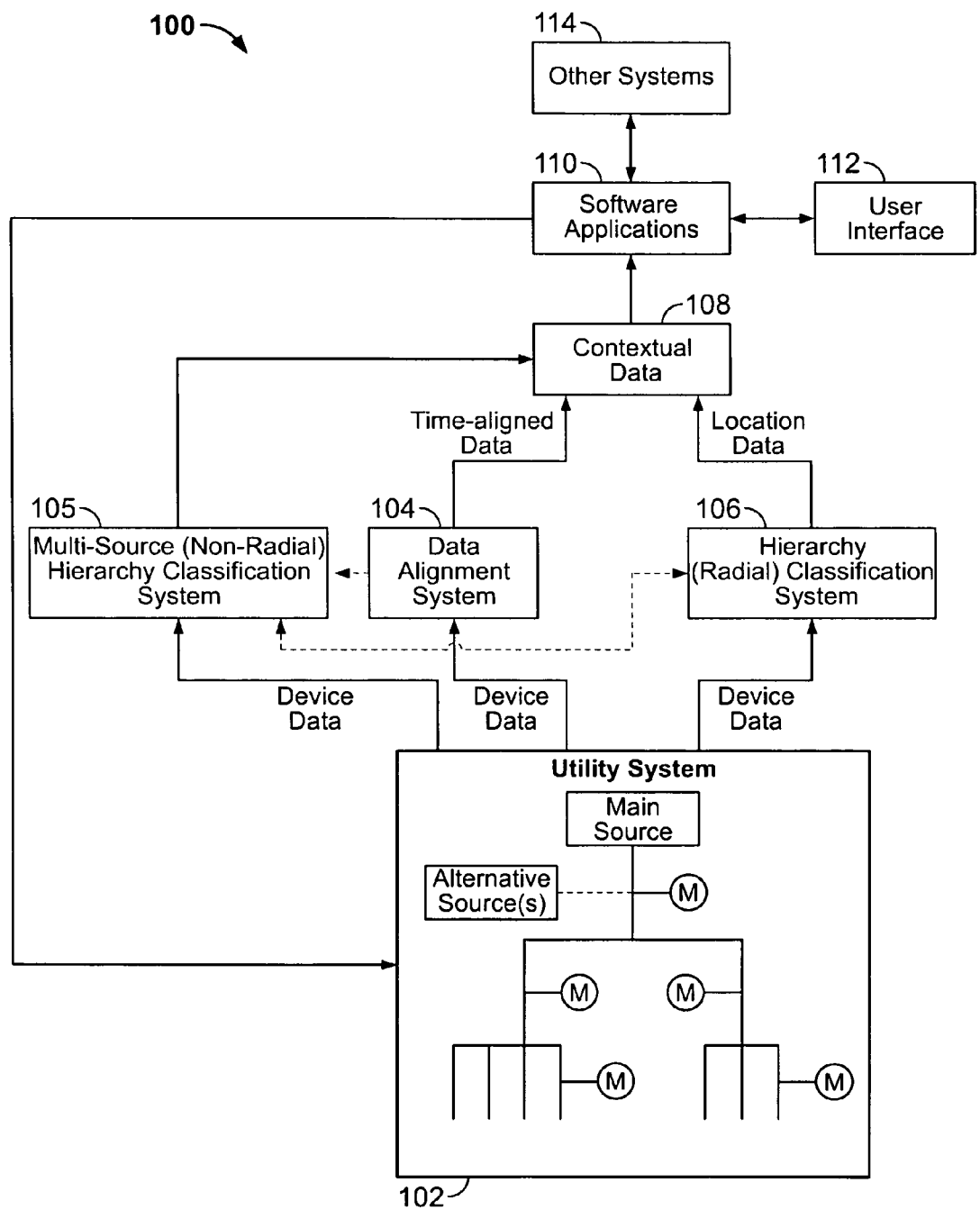
FIG. 1A is functional block diagram of an automated data integration monitoring system that includes a multi-source hierarchy classification system in accordance with aspects herein.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Turning now to FIG. 1, an automated data integrated monitoring system 100 is generally shown. A utility system 102 having a main source and one or more alternative sources and multiple intelligent electronic devices (hereafter "IEDs") or monitoring devices designated by the letter M provides data from each IED (M) that is communicated to an automated data alignment system 104, a multi-source hierarchical classification system 105, and an automated hierarchy classification system 106. As used herein, an IED or a monitoring device refers to any system element or apparatus with the ability to sample, collect, or measure one or more operational characteristics or parameters of the utility system 102. The utility being monitored in the utility system 102 can be any of the five utilities designated by the acronym WAGES, or water, air, gas, electricity, or steam. The data is aligned automatically in temporal or pseudo-temporal context in the automated data alignment system 104 and produces data that is temporally aligned such that it represents the data when it was actually seen simultaneously by the monitoring devices M in the power monitoring system 102. The hierarchy classification system 106 automatically learns the hierarchy of monitoring devices present in the utility system 102 and their positional relationships relative to one another. Examples of the hierarchy classification system 106 and the auto-learned hierarchy algorithms 400, 500, 550 associated therewith are described in commonly assigned U.S. Pat. No. 7,272,518, titled "Automated Hierarchy Classification in Utility Monitoring Systems," issued Sep. 18, 2007, and in commonly assigned PCT Patent Application No. PCT/US2006/034394, titled "Improvements in Hierarchy Determination for Power Monitoring Systems," filed Nov. 5, 2007 [SPL-0099]. A hierarchy as used herein includes a series of ordered groupings of things within a system. These relationships may be physical (based on a power system one-line diagram for example) or functional (based on cost centers or other organizational divisions). In an electrical power system context, a hierarchy describes the organization of the electrical power system (whether utility-side or demand-side of the point-of-common coupling (PCC)). As used herein, an "auto-learned hierarchy algorithm" refers to any of the auto-learned hierarchy algorithms disclosed in U.S. Pat. No. 7,272,518.

The data alignment system 104 aligns data, such as voltage, current, time, events, and the like, from the multiple IEDs in the utility system 102. When data from all the IEDs is aligned to the same point (or approximately the same point based on pseudo-temporal alignment) in time that the data occurred, the data can be put into a temporal or pseudo-temporal context from which additional decisions regarding hardware and software configuration can be automatically made or recommended. The measured data from various IEDs may be synchronized or approximately synchronized with each other within a temporal or pseudo-temporal context. Temporal alignment is more precise than pseudo-temporal alignment. Pseudo-temporal alignment takes data within an acceptable range based on load changes in the system. Pseudo-temporal alignment systems typically utilize a global positioning system (GPS) or network time protocol (NTP) for clock synchronization. Automatic temporal alignment implementations are described in commonly assigned U.S. patent application Ser. No. 11/174,099, filed Jul. 1, 2005, entitled "Automated Precision Alignment of Data in a Utility Monitoring System." In an automatic temporal alignment implementation, the data alignment system 104 aligns all IEDs (represented by M) in an electrical system hierarchy to the zero-crossing of all three phase voltages without the use of additional hardware, notwithstanding potential phase shifts between various IEDs, such as for example, those caused by certain transformer configurations. When the data of the monitoring devices is aligned with each other, the system data is essentially aligned with respect to the time it occurred, making more complex data analyses feasible.

Once the data from each IED M is aligned and each IED's position is determined within the hierarchy, the data is said to be in context 108. The contextual data 108 can be used by software applications 110 to provide and diagnose useful information about the utility system 102 beyond what is generally available if the data is not in context. Each IED measures characteristics of the utility system 102, and quantifies these characteristics into data that can be analyzed by a computer. For example, the monitoring device may measure power, energy, or other characteristics of electricity. In the electrical context, the IED may be based on a PowerLogic® Series 3000/4000 Circuit Monitor or a PowerLogic® ION7550/7650 Power and Energy Meter available from Schneider Electric or any other suitable IED device such as a microprocessor-based circuit breaker, relay, metering device, or power meter.

A user interacts with the software applications 110 via a conventional user interface 112. The software applications 110 can be linked to other systems 114, such as a billing system, and use the contextual data 108 to communicate messages between the other systems 114 and the user interface 112.

Generally, the hierarchy classification system 106 utilizes an auto-learned hierarchy algorithm in the monitoring system software that is based on rules and statistical methods. Periodically, the monitoring system software polls each monitoring device in the utility system 102 to determine certain characteristics or parameters of the utility system 102 at that node (represented by M). Multiple samples of specified parameters are taken from each IED in the system at the same given point in time. Once the parameter data is collected from each node M in the utility system 102, the auto-learned hierarchy algorithm analyzes the data and traces the relationships or links among the monitoring devices with respect to the time the data sample was taken and the associated value of the data sample. This analysis may be performed periodically to increase the probability that the hierarchy is accurate, or to ascertain any changes in the hierarchy. Once this iterative process reaches some predetermined level of statistical confidence that the determined layout of the utility system 102 is correct, the auto-learned hierarchy algorithm ends. The final layout of the utility system 102 is then presented to the user for concurrence. As each IED's data is evaluated over time (the learning period) with respect to all other IEDs using the auto-learned hierarchy algorithm, a basic layout of the hierarchical structure of the utility system 102 is determined based on the monitoring points available. In this respect, the auto-learned hierarchy algorithm uses historical trends of the data from each IED, and those trends are compared to determine whether any interrelationship (link) exists between the IEDs. A more detailed hierarchical structure can be determined with more monitoring points available for analysis.

Samples of specific electrical characteristics or parameters (such as power, voltage, current, or the like) are simultaneously taken from each IED in the utility system 102. This data is stored and analyzed with respect to the time the sample is taken, the associated value of the data point, and the IED providing the data.

Data taken from each IED in the utility system 102 is compared with each other to determine whether any correlation exists between the IEDs. The data is analyzed for statistical trends and correlations as well as similarities and differences over a predetermined period of time.

Figure 1B:
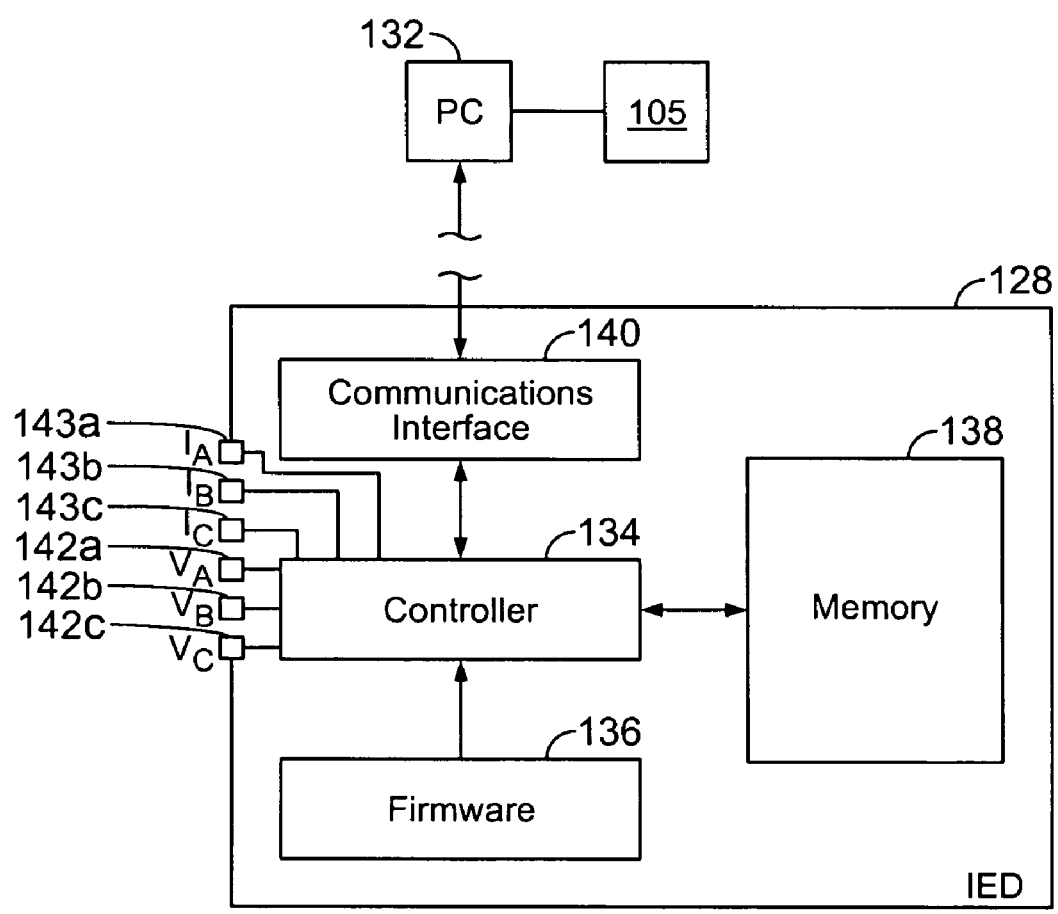
FIG. 1B is a functional block diagram of an exemplary intelligent electronic device.

An exemplary IED 128 is shown as a functional block diagram in FIG. 1B. The IED 128 includes a controller 134, firmware 136, memory 138, a communications interface 140, and three phase voltage conductor connectors 142a,b,c, which connect to the $V_A$, $V_B$, and $V_C$ phase voltage conductors, respectively, and are coupled to the controller 134. Three phase current conductor connectors 143a,b,c, which connect to the $I_A$, $I_B$, and $I_C$ phase current conductors, respectively, are optionally coupled to the controller 134. The firmware 136 includes machine instructions for directing the controller to carry out operations required for the monitoring device. Memory 138 is used by the controller 134 to store electrical parameter data measured by the IED 128.

Instructions from a computer 132 are received by the IED 128 via the communications interface 140. Those instructions include, according to an aspect herein, instructions that direct the controller 134 to mark the cycle count, to begin storing electrical parameter data, or to transmit to the computer 132 electrical parameter data stored in the memory 138. The electrical parameter data can include any data acquired by IEDs, including any combination of frequency variations, amplitude variations, and phase variations.

The data integrated monitoring system 100 also includes a multi-source hierarchical classification system 105 according to aspects disclosed herein, which may receive device data associated with the utility system 102 via manual or automated methods or time-aligned data that has been automatically generated by the automated data alignment system 104. The system 105 includes the algorithms (FIGS. 3-5, 6A, 6B, and 7A-7G) disclosed herein, which may be stored on a computer-readable medium. To differentiate among the prior-art auto-learned hierarchy algorithms and the novel algorithms disclosed herein, the novel algorithms shall be referred to as an "auto-learned multi-source hierarchy algorithm" or a "multi-source hierarchy algorithm" or a "multi-source algorithm" for short. The prior-art algorithms shall be referred to as merely "auto-learned hierarchy algorithm" or "auto-learned algorithm" for short, though these nomenclatures are not intended to imply that the auto-learned hierarchy algorithm is incapable of determining certain multi-source hierarchies. By "multi-source," it is meant that the utility system being monitored has a main source of a utility and at least one alternative source of that utility. In the electrical context, the alternative source of electricity may be a generator, a UPS system, or another utility point-of-delivery, for example.

Overview

The auto-learned hierarchy algorithm operated within certain rules and assumptions about the utility system being monitored. With respect to electrical systems, one may make certain assumptions about the electrical system to learn the hierarchy of monitoring devices in the electrical system. Basic assumptions made by the auto-learned hierarchy algorithm are based on Ohm's Law, conservation of energy, and working experience with typical electrical power systems. These assumptions include:

1. The electrical system being analyzed is in a single or multiple radial feed configuration. This assumption is further addressed herein.

2. The monitoring device measuring the highest energy usage is always assumed to be at the top of a hierarchical structure (e.g., Main1). This assumption is further addressed herein.

3. Multiple mains (Main1, Main2, Main3, etc.) may exist in the system.

4. Data is provided to the software by each monitoring device on the system.

5. The rate of sampling data by the monitoring devices is generally greater than the shortest duty cycle of any load.

6. Energy is consumed (not generated) on the electrical system during the data collection process. This assumption is further addressed herein.

7. The error due to the offset of time in all monitoring devices on the electrical system is minimal where data is pushed from the monitoring device to the system manager software.

8. Data is not collected for hierarchical purposes from two meters installed on the same point of an electrical system. This assumption is addressed in commonly assigned PCT Patent Application No. PCT/US2006/034394, titled "Improvements in Hierarchy Determination for Power Monitoring Systems," filed Nov. 5, 2007 [SPL-0099].

9. Monitoring devices with no load are ignored or only use voltage information (fundamental, harmonic, rms, symmetrical components) to determine their position in the hierarchy.

The auto-learned hierarchy algorithm incorporates other additional rules to determine the location within the hierarchy of a given monitoring device, with respect to the other monitoring devices, including the following:

1. Loads that start or stop affect the load profiles for any corresponding upstream metered data with a direct or indirect link to that load.

2. Voltage information (fundamental, harmonic, rms, symmetrical components) is relatively consistent for all monitoring devices on the same bus.

3. Transformer losses on the electrical system are minimal with respect to the loads downstream from the transformer. This rule is addressed in commonly assigned PCT Patent Application No. PCT/US2006/034394, titled "Improvements in Hierarchy Determination for Power Monitoring Systems," filed Nov. 5, 2007 [SPL-0099].

4. General correlation (over time) of loads between monitoring devices indicates either a direct or indirect link.

5. Multiple unmonitored loads at a point in the system are aggregated into a single unknown load (aka, a virtual load).

At least assumptions Nos. 1, 2, and 6 above will be further addressed herein. For the sake of simplicity, the implementations and aspects disclosed herein will focus on electricity as an exemplary utility, though these implementations and aspects also apply to other utilities (WAGES).

Because of each energy consumer's unique and diverse requirements to serve their specific needs, various energy system design configurations may be used. Some energy consumers use radial utility systems (see FIG. 1C), and the auto-learned hierarchy algorithm can automatically determine the hierarchical arrangement of monitoring devices within such radial systems. Radial systems have a single path between the source and the load. In this configuration, energy flows exclusively away from the source and to the load along a single path. Interruption of this path results in a loss of the utility product. Radial systems are less expensive, easier to plan, design, operate, analyze and predict. However, utility consumers sometimes configure their utility systems to include multiple sources of the utility product.

FIGS. 2A-2F illustrate simplified models of the six most commonly used configurations. Each of these models is useful and beneficial for various reasons, and will be discussed in more detail below. The end-user's purpose for incorporating a specific model depends upon their unique motivations and specific utility system requirements. It should be noted that other less common configurations are possible.

Table 1 below summarizes what the symbols found in FIGS. 2A-2G signify with respect to a first source of electricity (input #1), a second source of electricity (input #2), and a load. Note that a generator, though it is a source of energy and produces energy, may also consume energy (e.g., a block heater on a generator).

TABLE 1

Terminology for Multiple Source Systems

| Symbol | Utility PCC (Input #1) | Generator (Input #2) | Load |
|---|---|---|---|
| + | Flow from Utility | Producing Energy | Consuming Energy |
| 0 | No Energy Flow (or open) | No Energy Flow | No Energy Flow |
| − | Flow to Utility | Consuming Energy | Not applicable |
| ± | Flow to or from Utility | Not applicable | Not applicable |

To avoid confusion regarding the polarities for inputs and loads, Table 1 provides a "terminology" for clarification.

According to Table 1, energy flow toward a load is considered to be positive and energy flow away from a load is considered to be negative. Some inputs may be negative and some inputs may be positive. It is assumed that the load always consumes energy during steady-state conditions, and so, can only be positive or zero (if no load is present). Note that it is possible to have a non-source device with a negative power reading if that device is being backfed by a source. An example would be backfeeding through a feeder to get to a load. Finally it is assumed that generators may produce energy, consume energy (e.g., standby generators incorporating ancillary components such as block heaters consuming energy while the generator is not operating), or have no energy flow (off).

The six models illustrated in FIGS. 2A-2F are examples of multi-source systems in that they have two inputs or sources and one load in which there is more than one path for electrical current to or from the load. The multi-source systems described herein assume two sources or inputs for a given load; however, it should be readily apparent that more than two inputs to the electrical system under consideration may be considered by the multi-source hierarchy algorithms disclosed herein. In the case of more than two inputs, supplemental inputs may be lumped into either input #1 or input #2 or considered part of another hierarchy. For example, multiple generators would be aggregated into a single input in some models. In other models, such as the generator-as-load, islanding, and cogeneration models, the generator will be placed in its rightful location within the hierarchy.

Table 2 uses the symbols and terminology from Table 1 to characterize the flow of energy with respect to the load, input #1, and input #2, respectively, along with the figure that depicts that multi-source configuration. Each model is given a name for convenience to differentiate among the various models. Table 2 provides the directional flow of the energy for each of the inputs and loads for a given model. Again, other possible configurations may be used with the multi-source algorithms disclosed herein by aggregating supplemental inputs into one of the inputs or into the load.

TABLE 2

Truth Table for Common Multiple Source Configurations

| State | Load | Input #1 | Input #2 | FIG. (Model Name) |
|---|---|---|---|---|
| 1 | + | + | − | 2A ("Generator as Load") |
| 2 | + | ± | ± | 2B ("Non Radial-Fed") |
| 3 | + | 0 | + | 2C ("Islanding") |
| 4 | 0 | − | + | 2D ("Generation") |
| 5 | + | − | + | 2E ("Cogeneration") |
| 6 | + | + | + | 2F ("Load Reduction") |

An end-user may add more than one input (or source) into the utility system to realize improved reliability and/or cost savings, for example. Each model shown in FIGS. 2A-2F has its own purpose, and will be described separately due to dissimilarities that require a different approach to automatically determining its particular hierarchy. It should be noted that the nomenclature adopted for the models in FIGS. 1C and 2A-2G are for convenience only to aid the reader in quickly determining which model is under consideration. The particular nomenclature adopted is not intended to be a limitation on the particular configuration of the model. How each particular model type is ascertained automatically by the multi-source hierarchy algorithm is discussed in connection with the model-identification algorithm 600 shown in FIGS. 6A-6B.

Figure 1C:
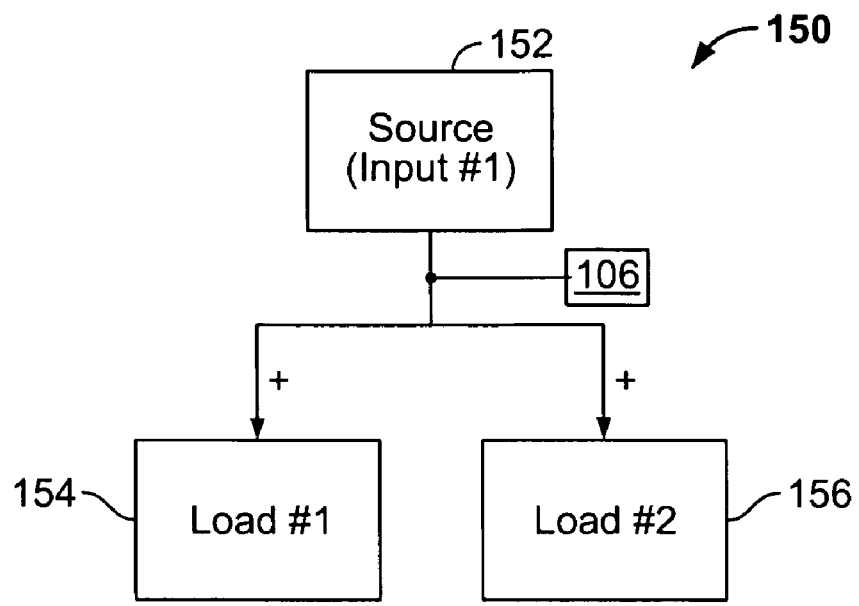
FIG. 1C is a functional block diagram of an exemplary prior-art radial fed utility system whose hierarchical layout is determined by an auto-learned hierarchy algorithm.

Radial-Fed Model (FIG. 1C)

Again, FIG. 1C illustrates a simplified radial-fed model 150 described above. The hierarchy of monitoring devices in this radial-fed system 150 is determined by the auto-learned hierarchy algorithm in the hierarchy classification system 106. The radial-fed system 150 comprises one utility-producing source (input #1) 152 and one or more energy-consuming loads 154, 156 (only two are shown for simplicity).

Figure 2A:
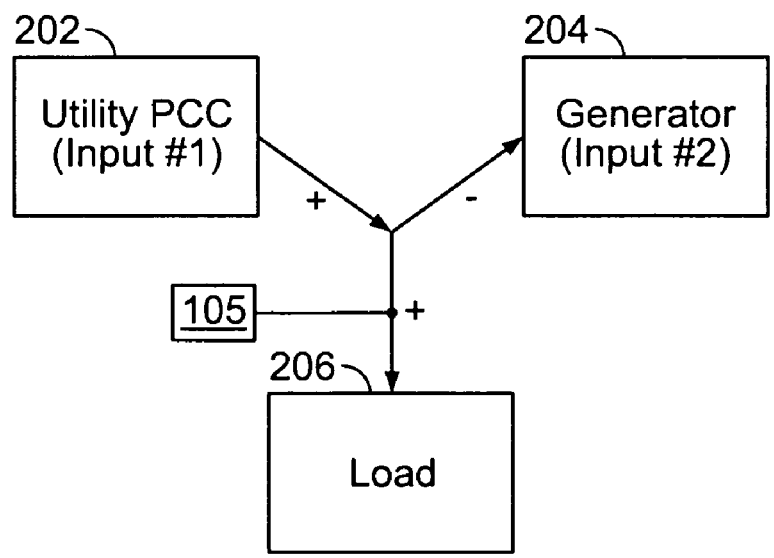
FIG. 2A is a functional block diagram of an exemplary "generator as load" model of a multi-source utility system according to an aspect disclosed herein.

Generator as Load Model (FIG. 2A)

A simplified generator-as-load model 200 is illustrated in FIG. 2A, which comprises a utility-producing source 202 at the point of common coupling (PCC) (input #1), an energy-consuming load 206, and an energy-consuming generator 204. This model 200 typically occurs when a standby generator's ancillary equipment is operating even though the generator 204 is not. Block heaters (aka, water jacket heaters, preheaters, etc.) are needed to start diesel-fueled generator sets, such as the generator 204, within the required 10 seconds for emergency power applications. Adequately preheating the generator sets also results in both reduced fuel costs and reduced engine deterioration. Electrically powered block heaters may be used to ensure the engine temperature of the generator 204 is maintained between 100° F. to 120° F.

When ancillary equipment is employed while the generator 204 is shutdown, energy flows to the generator 204 (i.e., the generator 204 consumes rather than produces energy). Thus, a negative real power flow is measured, assuming the polarity of the IED at the generator 204 is positive when generating. While the standby generators are off, their load profile (with ancillary loads) will be nearly constant into the generator due to the resistive nature of the heaters. There is also the possibility of the heaters cycling on and off if a thermostatic control is used to regulate the generator block temperature. In either case, the resistive loads are either 'on' or 'off' and exhibit a unique load profile.

The end-user identifies the IED(s) monitoring the generator 204 and data indicative of the IED(s) monitoring the generator 204 is received by the multi-source hierarchy algorithm in the multi-source hierarchy classification system 105. This identification may be inputted to the multi-source hierarchy algorithm before, during or after the time-series data from the generator-monitoring IED is collected. Once an IED(s) is identified as monitoring a generator(s), the multi-source hierarchy algorithm analyzes that IED(s) measured (e.g., the time-series data) and configured data.

This analysis may include evaluating and characterizing the variations in the time-series data for the generator 240 and the polarity and magnitude of the time-series data to identify whether the generator is acting as a load (i.e., consuming energy) or producing energy as a source. The generator-as-load model 200 will exhibit a relatively constant load while operating due to the operation of the ancillary equipment of the generator 204. Because generators are typically configured to display a positive polarity when they are generating power, a negative power flow may indicate the generator(s) are acting in a generator-as-load configuration. Assessing certain configuration parameters of the IED monitoring the generator 204, such as the VT (voltage transformer or voltage and potential transformer) ratios of the generator-monitoring IED, allows the multi-source hierarchy algorithm to determine the relative power flow through that IED based on the size of load for which the VTs and CTs (current transformers) are configured. A consistently smaller power flow through the generator-monitoring IED (relative to its configuration)

would indicate that the utility system is in a generator-as-load configuration 200. Other configured or measured aspects from the generator-monitoring IED(s) may also be considered to determine this form of model 200.

It should be noted that the generator-as-load model 200 is generally a special case for electrical system applications, assuming the system in question is operating normally (e.g., no unintentional leakage for other utilities such as water, air, gas, and steam, etc.).

Figure 2B:
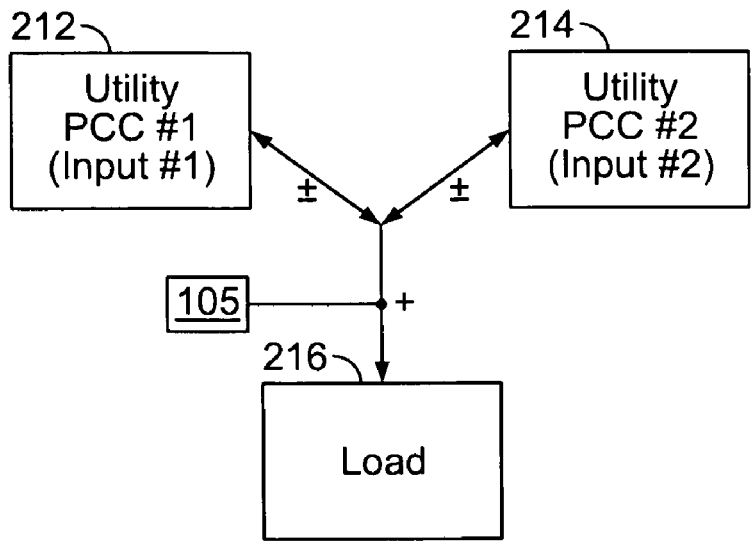
FIG. 2B is a functional block diagram of an exemplary "non-radial fed" model of a multi-source utility system according to an aspect disclosed herein.

Non Radial-Fed Model (FIG. 2B)

A simplified non-radial-fed model 210 is illustrated in FIG. 2B, which includes multiple paths to a load 216. The model 210 provides a redundant source 214 of energy to the load 216 should the other source 212 unexpectedly fail. This model 210 requires supplementary protective schemes to isolate a fault on either source 212, 214 and the load 216.

Main-tie-main configurations are a form of the non-radial-fed model 210, and may use one or both sources 212, 214 to serve the load 216. Typically, a main-tie-main configuration involves dividing the load 216 into smaller segments and serving these segments as per the radial-fed model (FIG. 1C) from both sources 212, 214. The two sources 212, 214 are divided by an open breaker, hence, the term "main-tie-main." In the event that only one source is available (either intentionally or unintentionally), the total load 216 can continue to be fed through the alternate source with minimal interruption. The main-tie-main configuration is also useful when performing maintenance on one of the sources (e.g., the service transformers or associated equipment).

In general, a main-tie-main configuration will automatically be determined by the auto-learned hierarchy algorithm because it will either appear as two smaller radial-fed systems or as one larger radial-fed system. A true non-radial-fed system (or loop system) is another matter; however, because energy is entering simultaneously the same system from two different sources 212, 214. Determining the hierarchy of a system with energy entering from two sources (i.e., model 210) is more difficult due to "correlative dilution." Furthermore, more than two sources (such as in a networked distribution system) causes even more correlative dilution. A loop system would be identified by the fact that the end-user did not identify a generator; however, there are two sources into the system.

The multi-source hierarchy algorithm receives from the end-user data indicative of the respective IEDs that are located at and monitoring the sources 212, 214 (whether they are a generator(s) or an additional feeder(s) from the utility). The hierarchy of the load can be determined by the auto-learned hierarchy algorithm, but additional input from the end-user can be received to substantiate the remaining portions. A second (and much more difficult) method of solving this problem is to iterate through the various hierarchy permutations based on the time-series data from the IEDs for the best result.

Figure 2C:
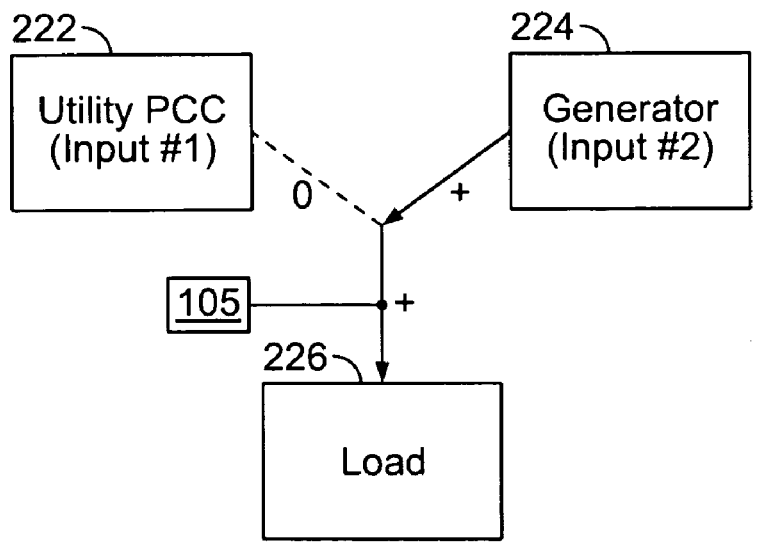
FIG. 2C is a functional block diagram of an exemplary "islanding" model of a multi-source utility system according to an aspect disclosed herein.

Islanding Model (FIG. 2C)

A simplified islanding model 220 is illustrated in FIG. 2C having a source (input #1) 222 producing no energy, a generator 224 producing energy to an energy-consuming load 226. The islanding model 220 occurs when a facility is operating independently from the utility grid. In general, standby generators use an open-transition switching scheme (via an automatic throw-over switch) to transfer the load from one source to another. Open-transition switching ensures that the two sources 222, 224 are completely isolated from each other to eliminate the chance of back-feeding a fault. Hospitals are an example of a customer who intentionally islands (isolates) part or all of their electrical system to serve emergency loads.

The multi-source hierarchy algorithm can determine the hierarchy of a monitoring system configured as an islanding model in two ways. This involves receiving from the end-user an identification of the IED that is located at the alternate source 224. Once the IED is identified, the auto-learned hierarchy algorithm learns the monitoring-system hierarchy and identifies and places the alternate source(s) 224 in the hierarchy accordingly. The second way exploits the fact that islanded systems do not operate perpetually in that configuration. The multi-source hierarchy algorithm identifies the model as an islanding type and waits until the electrical system's configuration returns to a radial model (or other model type) before ascertaining the monitoring system's hierarchy. Once the monitoring system's hierarchy is determined, the multi-source hierarchy algorithm places the IED(s) identified as measuring alternate source(s) in the hierarchy being developed.

Figure 2D:
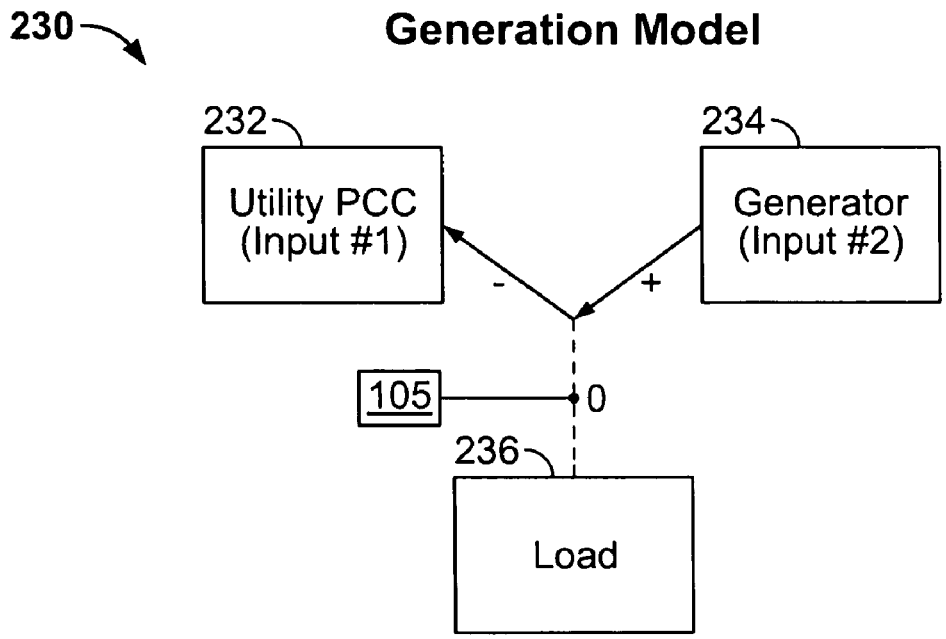
FIG. 2D is a functional block diagram of an exemplary "generation" model of a multi-source utility system according to an aspect disclosed herein.

Generation Model (FIG. 2D)

A simplified generation model 230 is illustrated in FIG. 2D, which comprises a generator 234 whose energy is consumed by the utility 232 and no energy flows to the load 236. This configuration will seldom be incorporated by demand-side energy users because their primary purposes typically result in energy consumption at some level. In other words, demand-side end-users have loads and do not exist for the sole purpose of generating energy to put back on the utility grid.

The multi-source hierarchy algorithm receives from the end-user identification information about each IED installed at each generator, and then aggregates them into groups and correlates their measurements against the IED(s) measuring the output to the utility grid. It should be noted that the IED(s) measuring the output to the utility grid will likely be configured to read a negative power flow. In summary, this configuration only uses a limited number of active IEDs (both input and output), and the hierarchy is easily determined by the multi-source hierarchy algorithm.

Figure 2E:
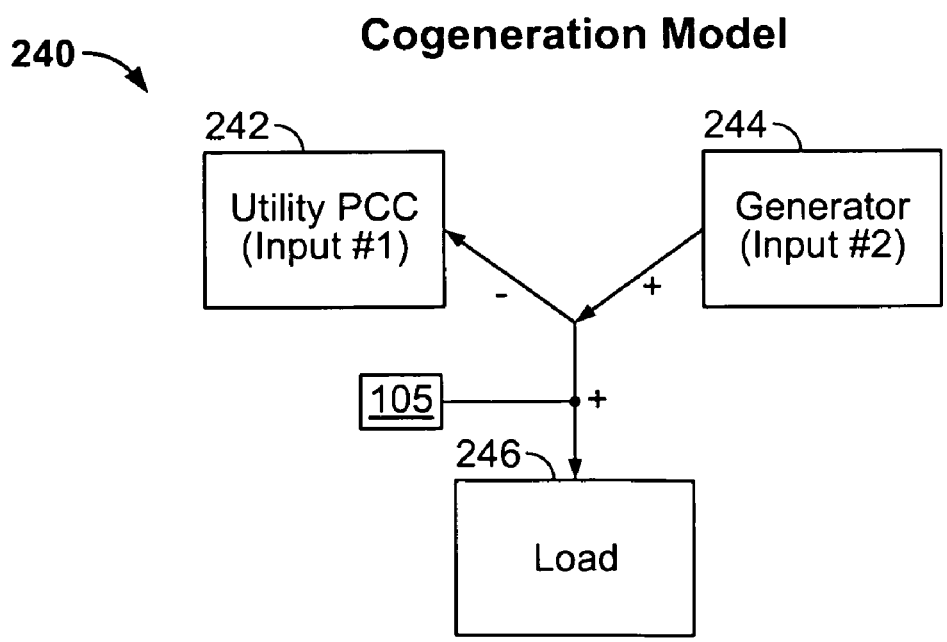
FIG. 2E is a functional block diagram of an exemplary "cogeneration" model of a multi-source utility system according to an aspect disclosed herein.

Cogeneration Model (FIG. 2E)

A simplified cogeneration model is illustrated in FIG. 2E, comprising an energy-producing generator 244, an energy-consuming utility source 242, and an energy-consuming load 246. Cogeneration (also combined heat and power, CHP) refers to the use of a power station or a heat engine to simultaneously generate both electricity and useful heat. Cogeneration is a thermodynamically efficient use of energy because the excess energy (typically in the form of waste heat) from one process is harvested and used for another process. Bottoming cycle plants (one form of a CHP model) use the waste heat from an industrial process to generate steam and drive a turbine(s).

As in previously discussed models, the monitoring system hierarchy of the IEDs monitoring the loads is easily determined by the auto-learned hierarchy algorithm. Identification by the end-user of an IED(s) monitoring the output of the generator(s) allows the multi-source hierarchy algorithm to place the IED(s) monitoring the generator 244 within the hierarchy. The IED(s) at the point of common coupling of the utility source 242 are typically configured for a positive power flow into the facility, so any power flow out of the facility onto the utility grid will be a negative polarity. In the cogeneration model 240, the final portion of the monitoring system hierarchy is determined by identifying the IED(s) with a negative power flow.

Validation of this model 240 and the monitoring system hierarchy may be performed by an evaluation of the CT/VT ratios of any IED(s) with a negative power flow. An IED(s) located at the PCC(s) 242 will likely have its CT/VT ratios configured to support the entire hierarchy's load. If the negative power flow is relatively smaller than the maximum power flow for which the CT/VT ratios are configured, it is more likely that the determination of a cogeneration model is correct. The multi-source hierarchy algorithm can compare the negative power flow against the maximum power flow as a check to verify the accuracy of the cogeneration model.

Figure 2F:
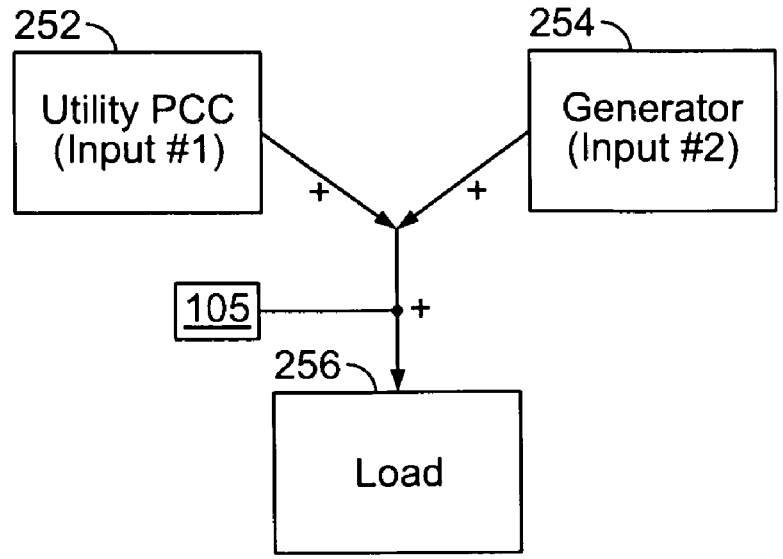
FIG. 2F is a functional block diagram of an exemplary "load reduction" model of a multi-source utility system according to an aspect disclosed herein.

Load Reduction Model (FIG. 2F)

A simplified load-reduction model 250 (may be referred to as a peak-shaving model) is illustrated in FIG. 2F, which includes two energy-producing sources, i.e., a utility 252 and a generator 254, whose energy is consumed by a load 256, though in other examples more than two sources may be present. In the load-reduction model 250, power flows from both the generator 254 and the utility 252 PCC to the load 256. Because the load 256 is fed from a combination of both the generator 254 and the PCC 252, the correlations are diluted between the load and the sources. Again, the auto-learned hierarchy algorithm will properly determine the hierarchy of the load; however, the links between the sources and the load will be more difficult to ascertain. Identifying multiple sources 252, 254 producing power flows with positive polarities makes their identification much more complicated. To further exacerbate this analysis, each source 252, 254 is providing an unknown percentage of the total power flow into the system 250 (all sources adding to 100%).

The multi-source hierarchy algorithm receives from the end-user identification data of each IED monitoring each source 252, 524 and then builds the monitoring system hierarchy. Again, the multi-source hierarchy algorithm may validate the model 250 by evaluating the CT/VT ratios as described above. Optionally, the end-user can identify which IED is monitoring a generator, and the multi-source hierarchy algorithm can determine where to place the generator based on an evaluation of the CT/VT ratios as described above.

Figure 2G:
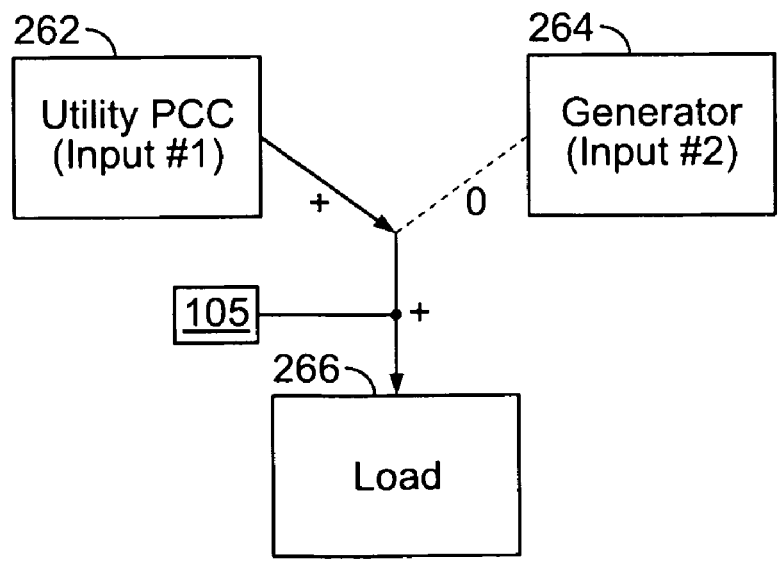
FIG. 2G is a functional block diagram of an exemplary "radial" model of a multi-source utility system according to an aspect disclosed herein.

Radial Model (FIG. 2G)

A simplified radial model 260 is shown in FIG. 2G, which includes an energy-producing utility (input #1) 262 and an energy-consuming load 266. An alternative source, a generator 264, is open and neither producing nor consuming energy.

Algorithms for Automatically Determining Multiple Source Utility Systems

Figure 3:
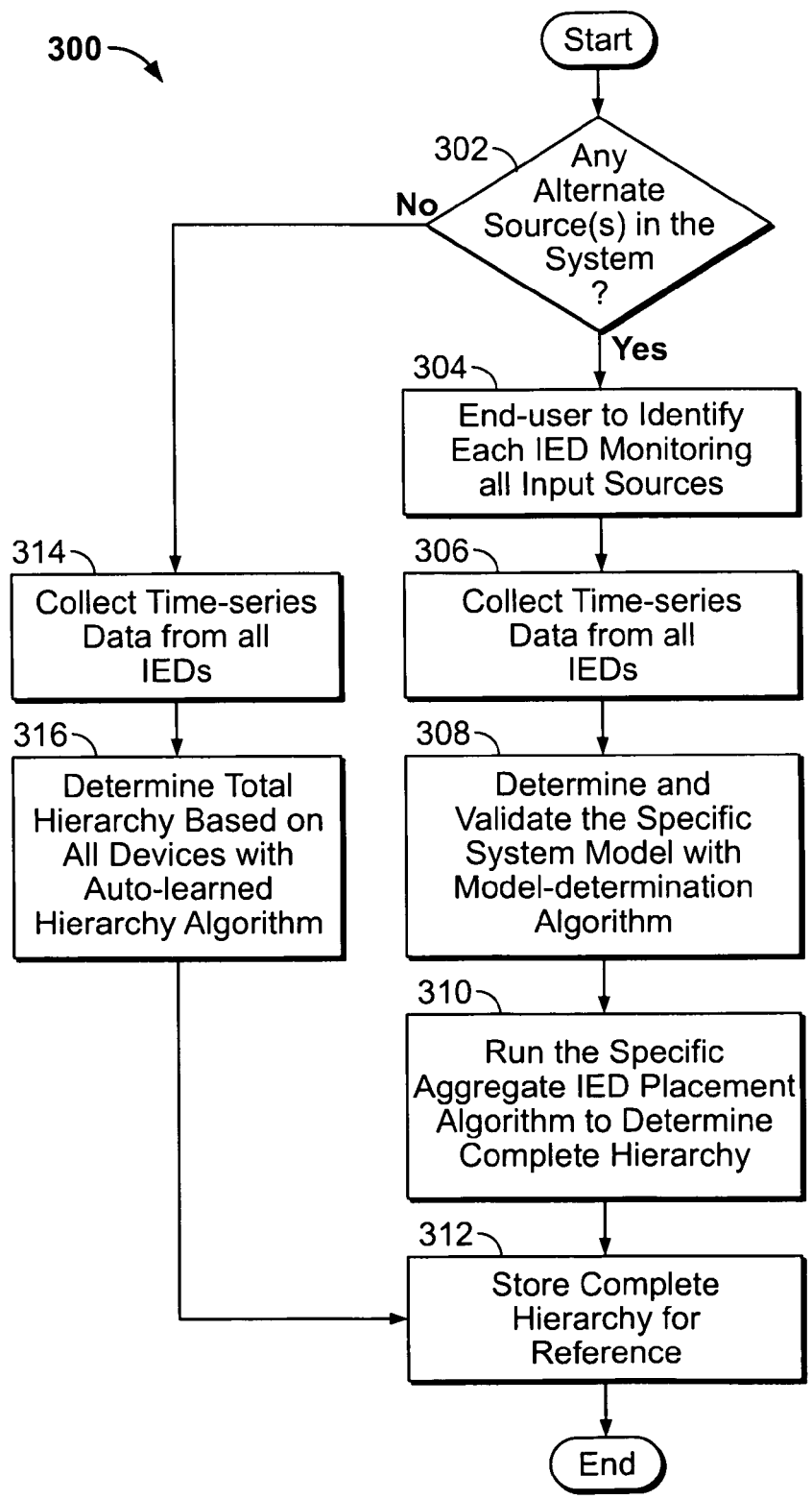
FIG. 3 is a flow chart diagram of a multi-source hierarchy algorithm according to an implementation disclosed herein.
Figure 4:
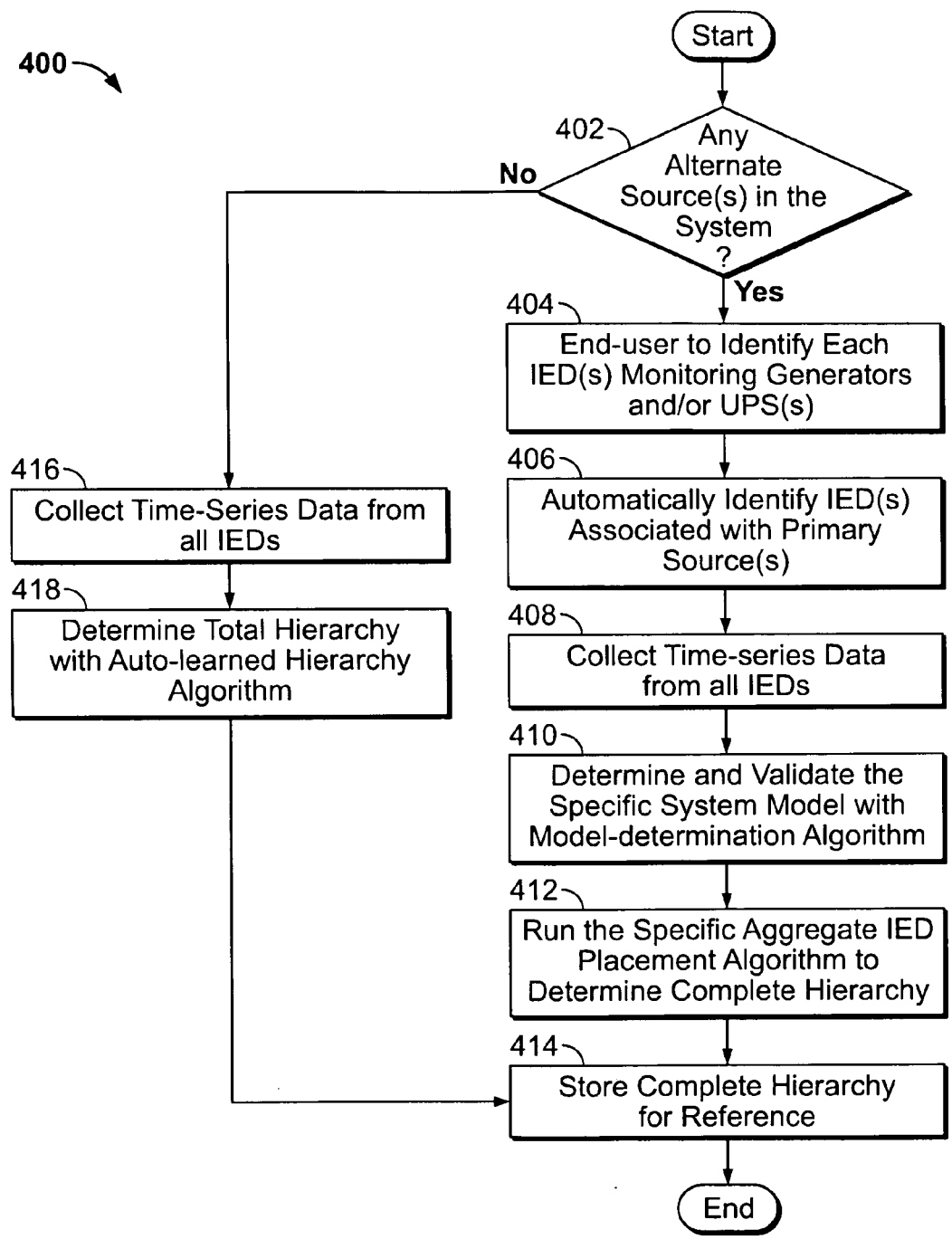
FIG. 4 is a flow chart diagram of a multi-source hierarchy algorithm according to another implementation disclosed herein.
Figure 5:
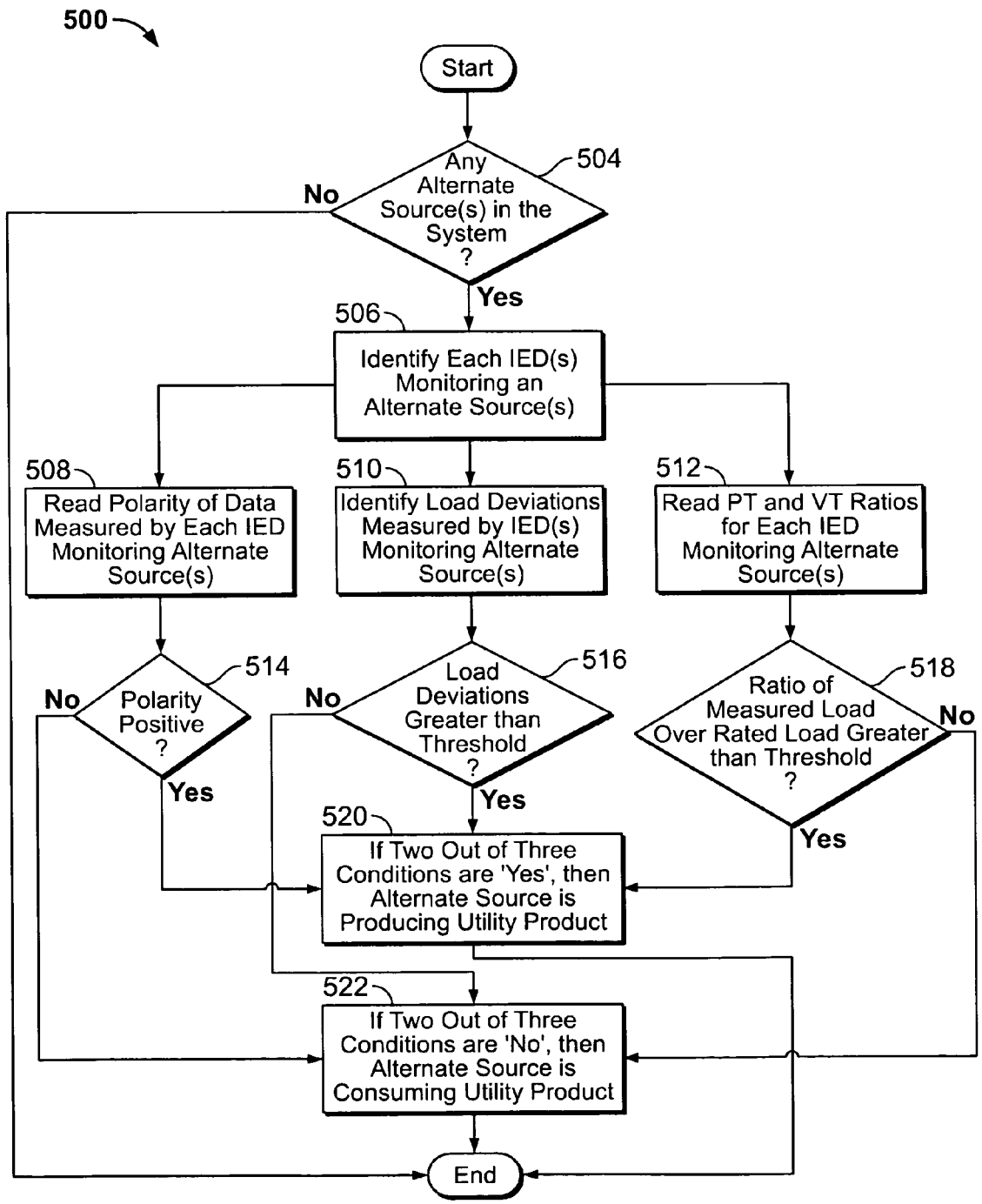
FIG. 5 is a flow chart diagram of an exemplary nomenclature-validation algorithm.
Figure 6A:
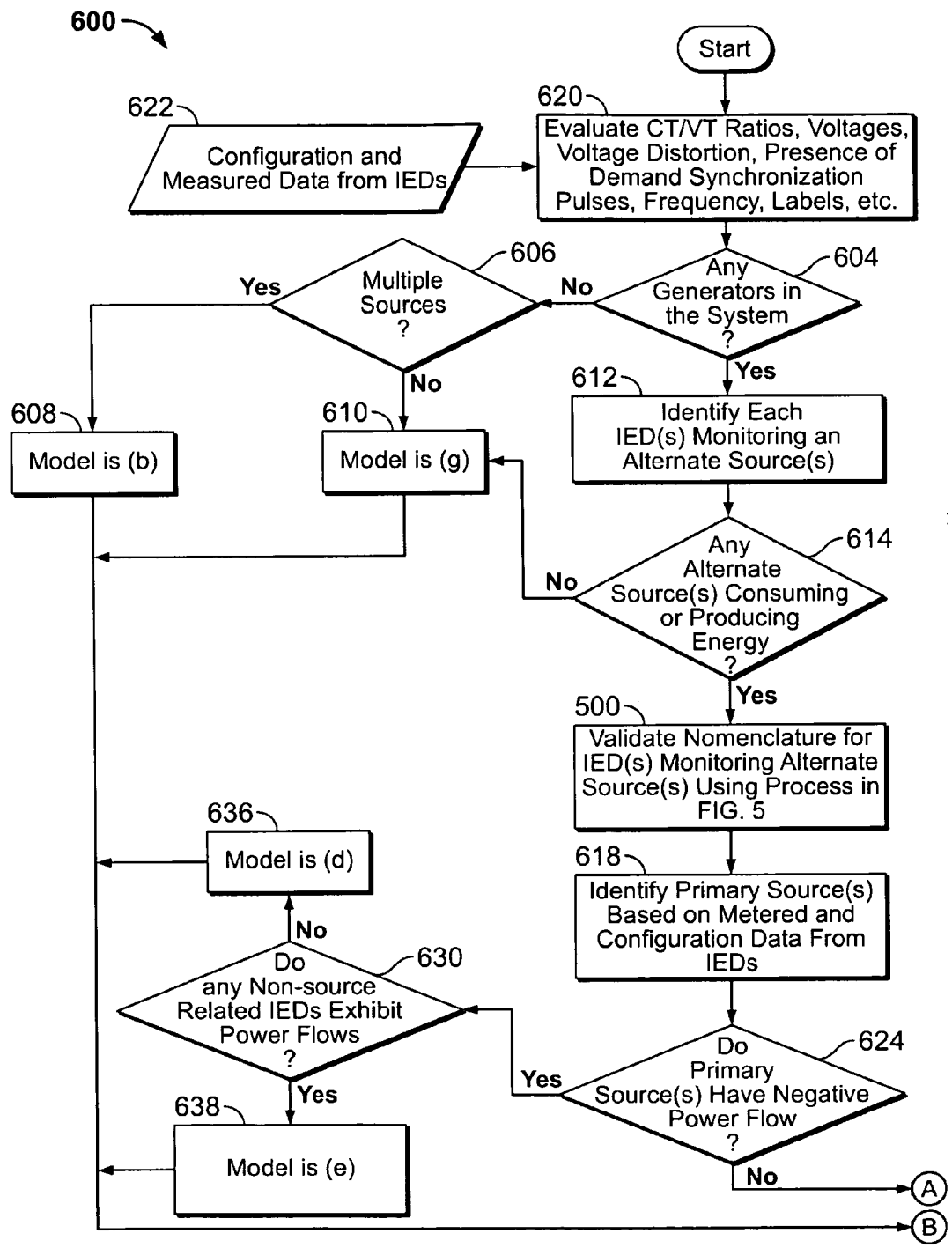
FIGS. 6A-6B are a flow chart diagram of an exemplary model-determination algorithm.
Figure 6B:
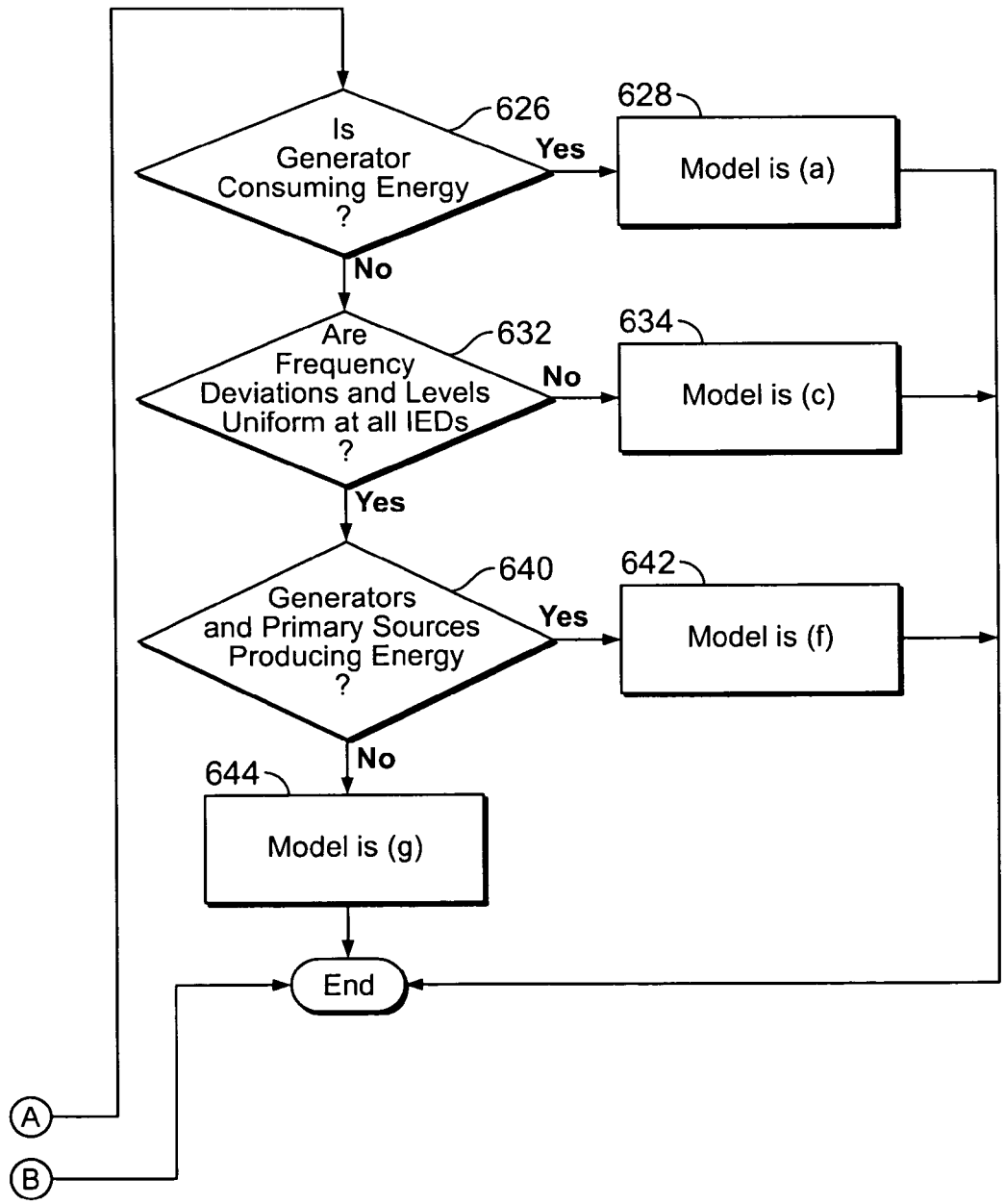
Figure 7A:
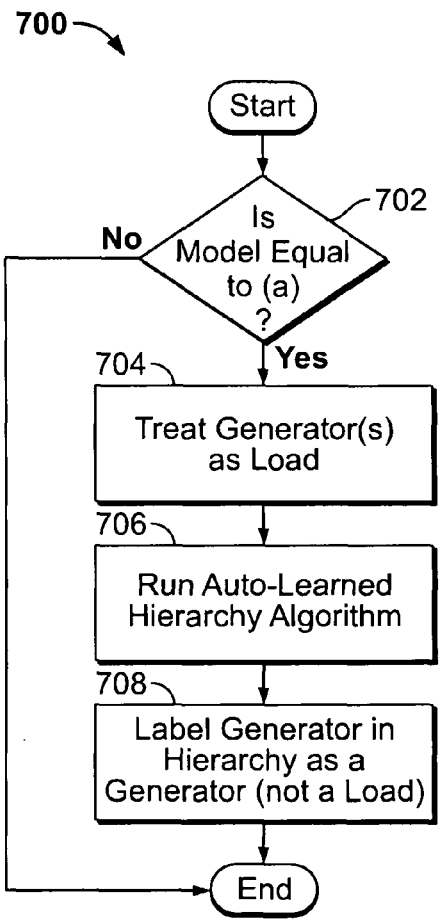
Figure 7B:
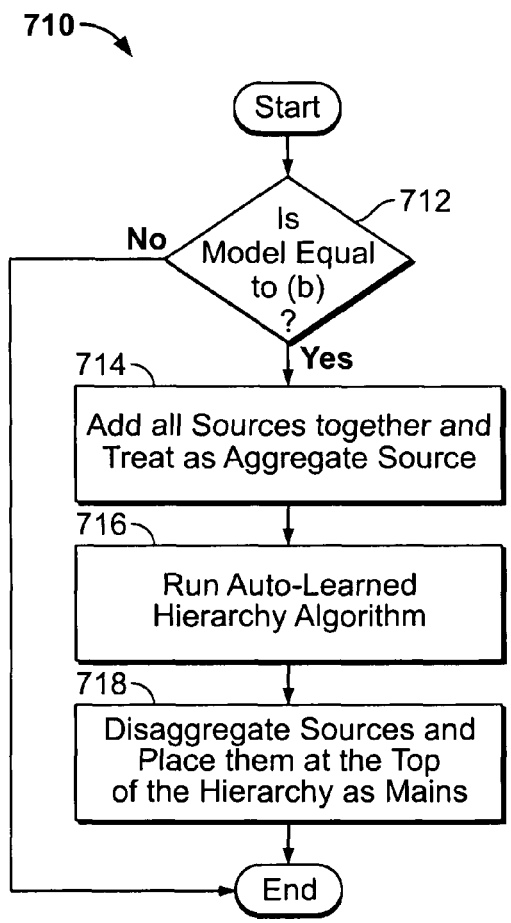
Figure 7F:
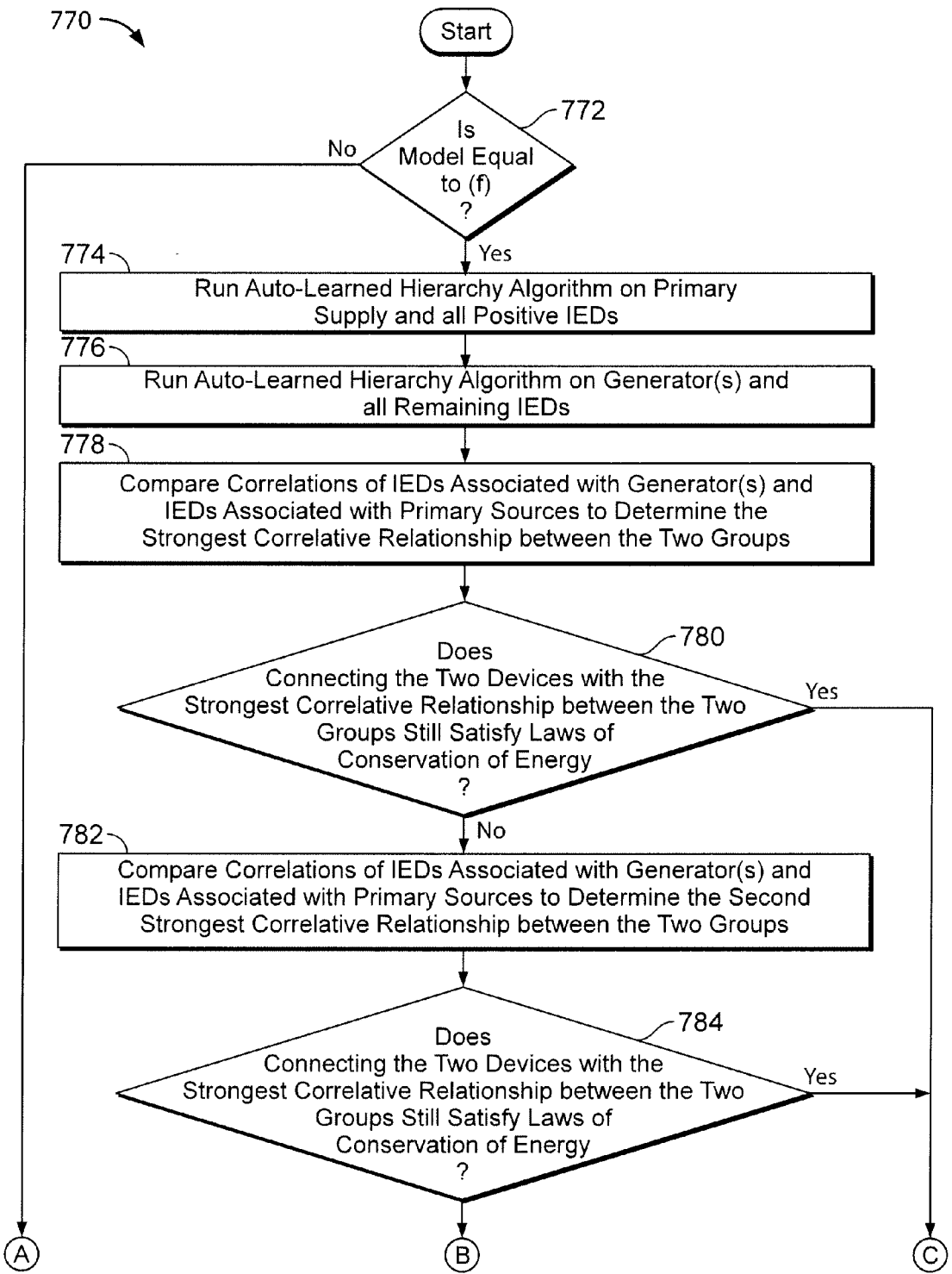
Figure 7F:
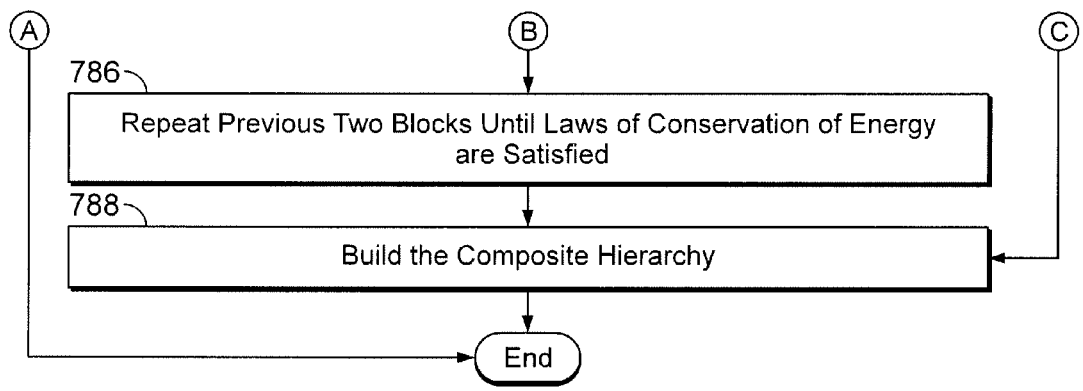
Figure 7G:
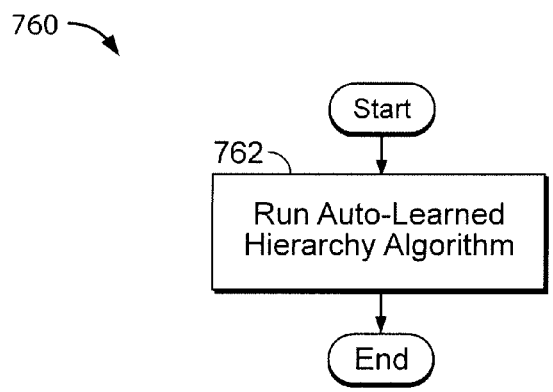

FIG. 3 is a flow chart diagram of an exemplary multi-source hierarchy algorithm 300 for automatically determining a hierarchy of a utility system with multiple sources. FIG. 4 is a flow chart diagram of an alternative multi-source hierarchy algorithm 400 for automatically determining a hierarchy of a utility system with multiple sources. FIG. 5 is a flow chart diagram of an exemplary nomenclature validation algorithm 500 for validating polarity nomenclature of an IED. FIGS. 6A and 6B are a flow chart diagram of an exemplary model-determination algorithm 600 for determining a model type for the utility system under consideration. FIGS. 7A-7G are exemplary algorithms for automatically determining a hierarchy of the different models corresponding to FIGS. 2A-2G, respectively. These algorithms will be discussed next. Note that the actions in the various blocks shown in these figures need not be carried out in the order in which they are presented, and those skilled in the art will appreciate that some blocks need not be carried out or may be eliminated altogether.

Multi-Source Hierarchy Algorithms (FIGS. 3-4)

The multi-source hierarchy algorithm 300 determines whether there is more than one input source (302). For example, the end-user is queried whether there is more than one source. If so, the end-user identifies each IED that is monitoring one of multiple input sources in the utility system (e.g., a generator, load, or utility PCC) (304). In other words, if there are two input sources, the end-user identifies the IED monitoring the first input source and the other IED monitoring the second input source. The algorithm 300 receives time-series data from all capable IEDs in the utility system being monitored (306). The algorithm 300 determines and validates the specific system model with the model-determination algorithm discussed in more detail below in connection with FIGS. 6A-6B (308). The algorithm 300 runs the specific aggregate IED placement algorithm (discussed in more detail below in connection with FIGS. 7A-7G) based on the model determined by the model-determination algorithm to determine the complete hierarchy of the IEDs monitoring the utility system (310). If there is only one input source (302), the algorithm 300 receives the time-series data from all capable IEDs in the monitoring system (314) and determines the total hierarchy based on the IEDs using the auto-learned hierarchy algorithm (316). The algorithm 300 stores the complete hierarchy in memory for reference (312).

An alternative multi-source hierarchy algorithm 400 is diagrammed in FIG. 4. The algorithm 400 queries the end-user to indicate whether there are any alternative sources in the utility system being monitored (402). If so, the end-user identifies each IED monitoring a generator or UPS in the utility system being monitored (404). The algorithm 400 receives as input from the end-user information identifying each IED that is monitoring a generator, UPS, or other source in the monitoring system (404). The algorithm 400 automatically identifies the IED(s) associated with the primary source(s) of utility on the utility system (406). The algorithm 400 receives time-series data from all capable IEDs in the monitoring system (408) and determines and validates the specific system model with the model-determination algorithm shown in FIGS. 6A-6B (410). The algorithm 400 runs the specific aggregate IED placement algorithm (FIGS. 7A-7G) to determine the complete hierarchy of the utility system (412). If there are no alternative sources of utility in the utility system (402), the algorithm 400 receives the time-series data from all capable IEDs in the monitoring system (416) and determines the total hierarchy based on the IEDs using the auto-learned hierarchy algorithm (418). The algorithm 400 stores the total hierarchy in memory for reference (414).

Nomenclature-Validation Algorithm (FIG. 5)

The nomenclature-validation algorithm 500 queries the end-user to indicate whether there are any alternate sources of energy in the electrical system (504). If so, the algorithm 500 receives from the end-user identification information about each IED that is monitoring an alternative source (506). The algorithm 500 reads the polarity of the time-series data measured by each IED that is monitoring an alternative source in the electrical system (508), identifies power deviations measured by such IED(s) (510), and reads the CT and VT ratios for each such IED(s) (512). The algorithm 500 determines whether the polarity of the time-series data is positive (514), whether the power or energy deviations exceed a threshold while the source is operating (516), and whether the ratio of the measured power over the maximum rating of the CT/VT configuration exceeds a threshold (518). If two out of the three conditions are affirmative, then the algorithm 500 determines that the alternative source is producing utility product. Otherwise, if two out of three conditions are negative, then the alternative source is consuming utility product (522). A power deviation informs the algorithm 500 how much the power flowing to or from a source is fluctuating. If the power to or from the source appears consistent or flat, then the source may be acting as a load (e.g., a heater) or as a generator. If the power is varying, the source is likely a functioning generator. The power deviations may be determined by taking the standard deviation of multiple power samples and comparing it against a threshold. It should be noted that the use of "current" and the respective CT ratio is as effective as "power" and the respective CT/VT ratios.

The nomenclature-validation algorithm 500 flexibly allows different polarity nomenclatures to be used in any given electrical system (e.g., one end-user may assign a positive polarity to energy-producing alternative sources while another end-user may assign a negative polarity to energy-producing alternative sources). Regardless of the end-user's polarity nomenclature, the algorithm 500 can still determine whether an alternative source is actually producing or consuming utility product.

Model-Determination Algorithm (FIGS. 6A-6B)

The model-determination algorithm 600 evaluates any one or more of the CT/VT ratios from all IEDs reporting such ratios, voltages, voltage distortion, the presence of demand synchronization pulses, frequency, labels (the identification string identifying an IED may include text or other indicia of the type of source that the IED is monitoring such as a main, a generator, or another utility source), and like information (620) based on configuration and measured time-series data from the IEDs 622. The algorithm 600 queries the end-user to indicate whether there are any generators in the electrical system being monitored (604). If there are, the algorithm 600 receives from the end-user identification information about each IED monitoring an alternative source (612). The algorithm 600 determines whether there are any alternative sources consuming or producing energy in the electrical system (614), and, if so, calls the nomenclature-validation algorithm 500 to validate the nomenclature for the IED(s) monitoring the alternative source(s) (500).

The algorithm 600 identifies the primary source of energy based on the time-series and configuration data from the IEDs (618). For example, the algorithm 600 may look for the IED reporting the highest CT/VT ratio, the IED reporting the least amount of voltage distortion, the IED reporting the highest voltage, the IED that is detecting demand synchronization pulses from the utility, or search the identification string associated with the identification of the IED for a predetermined string such as "main," and assign that IED as monitoring a primary source. The algorithm 600 determines whether the primary source has a negative power flow (624) by checking the sign (positive or negative) of the time-series data reported by the IED monitoring that primary source and optionally taking into account the nomenclature associated with that IED. If so, the algorithm 600 determines whether any non-source-related IEDs (e.g., IEDs monitoring loads) exhibit power flows (630). If so, the algorithm 600 determines that the electrical system is configured as the cogeneration model like the exemplary model 240 shown in FIG. 2E (638). If not, the algorithm 600 determines that the electrical system is configured as the generation model like the exemplary model 230 shown in FIG. 2D (636).

Returning to block (624), if the primary source does not have a negative power flow, the algorithm 600 determines whether a generator in the electrical system is consuming energy (626). To do so, the algorithm 600 knows which IED is monitoring a generator based upon end-user input, and checks the sign of the energy reported by that IED (see Table 1) whose polarity is verified by the nomenclature verification algorithm 500 to determine whether the generator is producing or consuming energy. If the generator is consuming energy, the algorithm 600 determines that the electrical system is configured as the generator-as-load model like the exemplary model 200 shown in FIG. 2A (628). If the generator is not consuming energy (i.e., it is producing energy), the algorithm 600 determines whether the frequency deviations and levels are uniform at all IEDs (632). If not, and the algorithm 600 determines that the electrical system is configured as the islanding model like the exemplary model 220 shown in FIG. 2C (634). If so, the algorithm 600 determines whether the generator and the primary source are both producing energy into the electrical system (640). If so, the algorithm 600 determines that the electrical system is configured as the load-reduction model like the exemplary model 250 shown in FIG. 2F (642). If not, the algorithm 600 determines that the electrical system is configured as the radial model like the exemplary model 260 shown in FIG. 2G (644).

Returning to block (604), if there are no generators in the electrical system being monitored (604), the algorithm 600 determines whether there are multiple sources of energy in the electrical system (606). If so, the algorithm 600 determines that the electrical system is configured as the non-radial-fed (or loop) model like the exemplary model 210 shown in FIG. 2B (608). If not, the algorithm 600 determines that the electrical system is configured as the radial model like the exemplary model 260 shown in FIG. 2G (610).

Develop Hierarchy Based on Model Type

Once the model type is identified by the model-determination algorithm 600, the multi-source hierarchy algorithm 300, 400 develops the entire hierarchy including the additional sources. With the knowledge of the model type and that alternate sources exist within the hierarchy, the multi-source algorithm 300, 400 proceeds to determine automatically where to place all IEDs in the overall hierarchy. FIGS. 7A-7G illustrate subroutines for determining where to place all IEDs including any alternate source into the overall hierarchy for each of the model types depicted in FIGS. 2A-2G, respectively. These subroutines will be referred to as "aggregate IED placement algorithms" for convenience. Recall that the multi-source hierarchy algorithm has already received identification information from the end-user as to which IEDs are monitoring alternative sources in the electrical system. In other words, at this point, the algorithm knows which IEDs are connected to and monitoring alternative sources of energy, it simply does not yet know how the entire hierarchy including these sources fit together. The following subroutines place all capable IEDs including alternative source(s) into the hierarchy for the model types shown in FIGS. 2A-2G.

A generator-as-load aggregate IED placement algorithm 700 (FIG. 7A) determines where to place the alternative source when it is a generator 204 (FIG. 2A) that is consuming energy. When the model type is determined to be the generator-as-load type (702), the algorithm 700 temporarily assumes that the generator 204 is a load (704), and calls the auto-learned hierarchy algorithm to place the generator 204 into the hierarchy as if it were a load (706). Once the generator has been placed into the automatically determined load hierarchy, the algorithm 700 labels the generator 204 in the hierarchy as a generator, not a load (708).

When the model type is determined to be the non-radial-fed type (712), a non-radial-fed aggregate IED placement algorithm 710 (FIG. 7B) aggregates all sources 212, 214 together and treats them as a single source (714). The algorithm 710 calls the auto-learned hierarchy algorithm, which automatically determines the hierarchy with the assumed single source (716). Once the hierarchy has been automatically determined, the algorithm 710 disaggregates the sources 212, 214 and places them at the top of the hierarchy as main sources (718).

When the model type is determined to be the islanding model type (722), an islanding aggregate IED placement algorithm 720 (FIG. 7C) determines groups of IEDs based on frequency variations and levels (724). IEDs measuring the same or similar frequency variations and levels or magnitudes (within a predetermined tolerance) are grouped together. The algorithm 720 calls the auto-learned hierarchy algorithm, which organizes each discrete group into a hierarchy of groups (726). Once the group hierarchy is determined with the sources at the top of their respective hierarchy, the algorithm 720 integrates the discrete groups if the state (e.g., a polarity of an IED changing from (+) to (−) or vice versa in the same time-series data set) and/or the model (i.e., any of the models shown in FIGS. 2A-2G discussed above) provide adequate information (728). In other words, the algorithm 720 waits until a model changes, e.g., from the model shown in FIG. 2G to the model shown in FIG. 2C to integrate the IED groups into the overall hierarchy. Once the overall model is ascertained, the throw-over switches (e.g., automatic transfer switches (ATSs), etc.) can also be placed within the context of the overall hierarchy.

When the model type is determined to be the generation type (732), a generation aggregate IED placement algorithm 730 (FIG. 7D) calls the auto-learned hierarchy on each IED (734). The algorithm 730 labels the utility source 232 and the generator 234 in the hierarchy as a utility source and a generator, respectively (736) so that they are distinguishable in the monitoring system hierarchy from the loads.

When the model type is determined to be the cogeneration type (742), a cogeneration aggregate IED placement algorithm 740 (FIG. 7E) determines whether any non-source IEDs (e.g., IEDs monitoring loads, such as the load 246) are measuring negative power flows (744). If so, the algorithm 740 accounts for the sign changes in the time-series data from the IEDs (746). The algorithm 740 treats the generator 244 as the only source of energy in the electrical system (750), and calls the auto-learned hierarchy with the generator(s) 244 as the main and only source (754). The hierarchy that is determined may be "upside down" with the generator 244 at the top of the hierarchy and the other IEDs below the generator 244. The algorithm 740 then inverts the hierarchy to show the main source 242 at the top of the hierarchy and the other IEDs (including the generator(s)) in their logical spatial positions within the hierarchy of the electrical system being monitored (758).

Returning to block 744, if there are no non-source IEDs measuring negative power flows, the algorithm 740 places the generator 244 at the top of the hierarchy (748). The algorithm 740 aggregates all the generator sources together (in FIG. 2E, generator(s) 244 are aggregated together) and treats them as a single source (752). The algorithm 740 calls the auto-learned hierarchy with the single source as a parameter to automatically determine the composite hierarchy. Once the composite hierarchy is automatically determined, the algorithm 740 disaggregates the generators 244 and places them at the top of the hierarchy as main sources (756) along with the utility source 242.

When the model type is determined to be the load-reduction type (772), a load-reduction aggregate IED placement algorithm 770 (FIG. 7F) runs the auto-learned hierarchy algorithm on the primary source (e.g., source 252 in FIG. 2F) and all IEDs reporting positive energy flows to produce a first hierarchy (774). The algorithm 770 also runs the auto-learned hierarchy on the generator (e.g., generator 254 in FIG. 2F) and all remaining IEDs to produce a second hierarchy (776). The algorithm 770 compares the correlations of IED(s) associated with the generator 254 (group 1) and the IED(s) associated with the primary source 252 (group 2) to determine the strongest correlative relationship between the two groups (778) to produce two IEDs whose time-series data most strongly correlates with one another. The algorithm 770 temporarily links these two IEDs to determine whether their connection satisfies the laws of conservation of energy (780). If the connection would violate the laws of conservation of energy, the algorithm 770 compares the correlations of IED (s) associated with the generator 254 (group 1) and the IED(s) associated with the primary source 252 (group 2) to determine the second strongest correlative relationship between the two groups (782) to produce a set of two IEDs whose time-series data has the second-most strongest correlation with one another. The algorithm 770 again temporarily links these two IEDs together to determine whether their connection satisfies the laws of conservation of energy (780). If not, the algorithm 770 iterates through blocks (782, 784) until the laws of conservation of energy are satisfied (786). Once the laws of conservation of energy are satisfied, the algorithm permanently links the two IEDs together, thus linking the two hierarchies together building the composite hierarchy with these two sources placed accordingly (788).

When the model type is determined to be the radial type or none of the foregoing six types, a radial aggregate IED placement algorithm 760 (FIG. 7G) runs the auto-learned hierarchy algorithm on all capable IEDs in the electrical system being monitored (762).

Other Considerations

An efficient method to identify specific model types of monitoring systems and determine a specific monitoring system's hierarchy is to allow the end-user to identify all sources of utility (e.g., generators, UPSs, alternate utility PCCs, etc.) in the utility system. This identification can occur at any time (before, during, or after the time-series data from the monitoring devices in the monitoring system is collected) if the system model is static. However, if the system model is dynamic, it is more efficient to identify the sources before the time-series data is collected due to a requirement for more data.

Conclusions

By allowing the end-user to identify the purpose (source or load) of some IEDs within their monitoring system, the multi-source hierarchy algorithms disclosed herein can accurately determine monitoring system hierarchies on even the most difficult utility systems. It is also possible to determine the veracity of data collected by the multi-source hierarchy algorithm if the system model is dynamically changing. Finally, the multi-source hierarchy algorithm can use certain IED configuration data to corroborate the projected model.

Any of these algorithms include machine readable instructions for execution by: (a) a processor, (b) a controller, and/or (c) any other suitable processing device. It will be readily understood that the computer 132 includes such a suitable processing device. Any algorithm disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented in any flowchart depicted herein may be implemented manually. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of automatically determining a hierarchy indicating how a plurality of devices are linked together in a multi-source utility system having a main source of a utility and at least one other alternative source of said utility, comprising:
    receiving an indication of a first device of said plurality of devices, said indication indicating that said first device is monitoring said at least one other alternative source of said utility;
    receiving at time intervals device data measured by each of said plurality of devices, said device data being indicative of a characteristic of said utility;
    automatically determining how at least some of those of said plurality of devices that are not directly monitoring said at least one other alternative source are linked together to produce at least a partial representation of a hierarchy of said multi-source utility system;
    storing said hierarchy on a non-transitory computer-readable medium;
    automatically determining said first device's location in said hierarchy; and
    updating said hierarchy to include a representation of said location of said first device within said hierarchy.

2. The method of claim 1, further comprising automatically determining a model type of said utility system, said model type indicating whether said main source is producing or consuming said utility and whether at least one other alternative source is producing or consuming said utility, wherein said automatically determining said first device's location in said hierarchy is based upon said model type.

3. The method of claim 2, wherein said model type is at least one of
    a first model type wherein said main source produces said utility and said at least one alternative source consumes said utility,
    a second model type wherein said main source and said at least one alternative source produces or consumes said utility, said at least one alternative source being another utility source,
    a third model type wherein said main source does not produce or consume said utility and said at least one alternative source produces said utility,
    a fourth model type wherein said main source consumes said utility, said at least one alternative source produces said utility, and a load connected to said main source and to said at least one alternative source neither produces nor consumes said utility,
    a fifth model type wherein said main source consumes said utility and said at least one alternative source produces said utility and a load connected to said main source and to said at least one alternative source consumes said utility, or
    a sixth model type wherein said main source and said at least one alternative source produce said utility.

4. The method of claim 2, wherein said automatically determining said model type of said utility system includes determining any one or more of the following: whether a flow of a characteristic of said utility of said main source is negative, whether said at least one alternative source is consuming said utility, or whether said main source is producing said utility.

5. The method of claim 4, wherein said utility system is an electrical system, said utility is energy, said characteristic is power, and wherein said automatically determining said model type of said utility system further includes receiving an indication that said at least one alternative source is a generator.

6. The method of claim 5, wherein said automatically determining said model type of said utility system further includes evaluating, based on said device data associated with at least one of said plurality of devices, at least one of a current transformer ratio, a voltage transformer ratio, a voltage, a voltage distortion, a frequency, identification information associated with said at least one of said plurality of devices, or the presence of a demand synchronization pulse, to determine which of said plurality of devices is monitoring said main source.

7. The method of claim 5, wherein said device data includes frequency data, and wherein said automatically determining said model type of said utility system further includes determining whether deviations of said frequency data exceed a threshold.

8. The method of claim 3, further comprising:
    responsive to said model type being said first model type, treating said at least one alternative source as a load in said utility system; and
    responsive to said automatically determining said first device's location in said hierarchy, storing an indication that said at least one alternative source is an alternative source.

9. The method of claim 3, further comprising:
    responsive to said model type being said second model type, aggregating said main source and said at least one alternative source into a single source; and responsive to said determination of said at least partial representation of said hierarchy, disaggregating said single source into said main source and said at least one alternative source, wherein said updating includes placing said main source and said at least one alternative source at the top of said hierarchy.

10. The method of claim 3, further comprising:
responsive to said model type being said third type, determining whether a variance of a characteristic of said utility exceeds a threshold; and
grouping those of said plurality of devices whose device data is associated with said variance that exceeds said threshold into at least one discrete group.

11. The method of claim 3, further comprising responsive to said model type being said fourth type, storing an indication that said at least one alternative source is an alternate source.

12. The method of claim 3, further comprising:
responsive to said model type being said fifth type, determining whether any of said plurality of devices, which are not monitoring said main source or said at least one alternative source, measure a negative flow of a characteristic of said utility;
responsive to at least one of said devices measuring said negative flow, treating said at least one alternative source as the only source of said utility in said utility system and inverting said hierarchy such that said main source is at the top of said hierarchy; or
responsive to none of said devices measuring said negative flow, aggregating said main source and said at least one alternative source into a single source.

13. The method of claim 3, further comprising:
responsive to said model type being said sixth type, wherein said at least partial representation of said hierarchy is determined by automatically determining how a device of said plurality of devices that is monitoring said main source and those of said devices measuring a positive flow of a characteristic of said utility are linked together in said hierarchy;
automatically determining how said first device and all remaining devices that have not been placed into said hierarchy are linked together in said hierarchy;
correlating (a) device data of a first group including said devices associated with said at least one alternative source with (b) device data of a second group including said device associated with said main source to determine a pair of said devices having a correlation between said first group and said second group; and
determining whether linking said pair of said devices causes a total amount of said utility consumed by said utility system to exceed a total amount of said utility produced into said utility system.

14. The method of claim 1, further comprising automatically determining whether said at least one source is producing said utility or consuming said utility in said utility system by:
receiving polarity data from said first device, said polarity data indicating a polarity of a characteristic of said utility; and
responsive to said polarity being positive, storing an indication that said at least one source is producing said utility.

15. The method of claim 14, wherein said automatically determining whether said at least one source is producing said utility or consuming said utility further includes:
determining a load deviation of a load connected to said first device;
responsive to said load deviation exceeding a threshold, storing an indication that said at least one source is producing said utility.

16. The method of claim 14, wherein said automatically determining whether said at least one source is producing said utility or consuming said utility further includes:
determining a ratio of an actual characteristic to a rated characteristic associated with said load;
responsive to said ratio exceeding a second threshold, storing an indication that said at least one source is producing said utility.

17. The method of claim 1, further comprising validating a nomenclature of a polarity of a characteristic of said utility to determine whether a positive polarity of said characteristic of said utility refers to a consumption or production of said utility.

18. The method of claim 10, further comprising:
responsive to said model type being said third type, determining whether a variance of a characteristic of said utility exceeds a second threshold;
grouping those of said plurality of devices whose device data is associated with said variance that exceeds said second threshold into a second discrete group; and
aggregating said at least one discrete group and said second discrete group into said hierarchy.

19. The method of claim 18, further comprising determining a placement of an automatic transfer switch within said hierarchy.

20. A computer program product comprising one or more non-transitory tangible media having a computer readable program logic embodied therein, the computer readable program logic configured to be executed to implement a method for automatically determining a hierarchy indicating how a plurality of devices are linked together in a multi-source utility system having a main source of a utility and at least one other alternative source of said utility, the method comprising:
receiving an indication of a first device of said plurality of devices, said indication indicating that said first device is monitoring said at least one other alternative source of said utility;
receiving at time intervals device data measured by each of said plurality of devices, said device data being indicative of a characteristic of said utility;
automatically determining how at least some of those of said plurality of devices that are not directly monitoring said at least one other alternative source are linked together to produce at least a partial representation of a hierarchy of said multi-source utility system;
storing said hierarchy on a non-transitory computer-readable medium;
automatically determining said first device's location in said hierarchy; and
updating said hierarchy to include a representation of said location of said first device within said hierarchy.

* * * * *